US008814103B2

(12) United States Patent
Szulyk et al.

(10) Patent No.: US 8,814,103 B2
(45) Date of Patent: Aug. 26, 2014

(54) POSITION CONTROL SYSTEM FOR CROSS COUPLED OPERATION OF FLY-BY-WIRE CONTROL COLUMNS

(75) Inventors: Zenon P. Szulyk, Mount Prospect, IL (US); Ganga P. Jayaraman, Buffalo Grove, IL (US); Charles C. Frayman, Mundelein, IL (US); Brian P. Dyra, Elmhurst, IL (US); Darryl S. Stachniak, Chicago, IL (US)

(73) Assignee: Woodward MPC, Inc., Skokie, IL (US)

( * ) Notice: Subject to any disclaimer, the term of this patent is extended or adjusted under 35 U.S.C. 154(b) by 635 days.

(21) Appl. No.: 12/844,867

(22) Filed: Jul. 28, 2010

(65) Prior Publication Data

US 2012/0025029 A1 Feb. 2, 2012

(51) Int. Cl.
*B64C 13/04* (2006.01)

(52) U.S. Cl.
USPC .......... 244/223

(58) Field of Classification Search
USPC .......... 244/220–223, 228, 229, 234, 236, 244/194–196, 99.2, 99.4
See application file for complete search history.

(56) References Cited

U.S. PATENT DOCUMENTS

| | | | | |
|---|---|---|---|---|
| 2,060,806 | A * | 11/1936 | Hunt | 244/220 |
| 2,833,496 | A * | 5/1958 | McRuer et al. | 244/196 |
| 3,776,058 | A | 12/1973 | French | |
| 3,902,379 | A | 9/1975 | Bennett et al. | |
| 4,422,851 | A | 12/1983 | Hayashigawa et al. | |
| 4,473,203 | A | 9/1984 | Barnoin et al. | |
| 4,688,443 | A | 8/1987 | Fabre et al. | |
| 4,716,399 | A | 12/1987 | Nordlund | |
| 4,717,098 | A | 1/1988 | Walker et al. | |
| 4,980,835 | A * | 12/1990 | Lawrence et al. | 701/4 |
| 5,107,080 | A | 4/1992 | Rosen | |
| 5,149,023 | A | 9/1992 | Sakurai et al. | |
| 5,291,113 | A | 3/1994 | Hegg et al. | |
| 5,456,428 | A | 10/1995 | Hegg | |
| 5,694,014 | A * | 12/1997 | Hegg et al. | 318/564 |
| 5,900,710 | A | 5/1999 | Gautier et al. | |
| 6,128,554 | A | 10/2000 | Damotte | |
| 6,459,228 | B1 * | 10/2002 | Szulyk et al. | 318/632 |
| 6,572,055 | B1 | 6/2003 | Bernard | |

(Continued)

FOREIGN PATENT DOCUMENTS

| | | |
|---|---|---|
| EP | 1 918 196 A1 | 5/2008 |
| FR | 2 558 136 A1 | 7/1985 |

(Continued)

OTHER PUBLICATIONS

U.S. Appl. No. 12/845,160, filed Jul. 28, 2010, Stachniak et al.

(Continued)

*Primary Examiner* — Valentina Xavier
(74) *Attorney, Agent, or Firm* — Reinhart Boerner Van Deuren P.C.

(57) ABSTRACT

A aircraft control system is provided that provides tactile feedback between control columns of the aircraft relating to discrepancies in the control inputs to the sticks of the respective control columns. In one implementation, the sticks each have an associated feedback assembly that is adjustable relative to mechanical ground to adjust the feedback profile applied to the corresponding stick. The position of each feedback assembly is adjusted based on a relative displacement between the other feedback assembly and its corresponding stick to provide active feedback relating to the control of the other control column.

21 Claims, 3 Drawing Sheets

(56) References Cited

U.S. PATENT DOCUMENTS

| | | | | |
|---|---|---|---|---|
| 7,648,106 | B2 * | 1/2010 | Granier et al. | 244/223 |
| 7,878,461 | B2 * | 2/2011 | Hirvonen et al. | 244/223 |
| 8,002,220 | B2 * | 8/2011 | Wilkens | 244/223 |
| 8,104,720 | B2 * | 1/2012 | Hirvonen et al. | 244/194 |
| 2002/0135327 | A1 * | 9/2002 | Szulyk et al. | 318/34 |
| 2004/0026158 | A1 * | 2/2004 | Rieth et al. | 180/402 |
| 2004/0160415 | A1 * | 8/2004 | Rosenberg et al. | 345/156 |
| 2005/0080495 | A1 * | 4/2005 | Tessier et al. | 700/63 |
| 2007/0164168 | A1 * | 7/2007 | Hirvonen et al. | 244/223 |
| 2008/0142642 | A1 * | 6/2008 | Marino et al. | 244/223 |
| 2008/0156939 | A1 * | 7/2008 | Hanlon et al. | 244/223 |
| 2009/0153370 | A1 * | 6/2009 | Cooper et al. | 341/21 |
| 2009/0302171 | A1 * | 12/2009 | Wilkens | 244/223 |
| 2011/0148666 | A1 * | 6/2011 | Hanlon et al. | 340/971 |
| 2011/0190965 | A1 * | 8/2011 | Hirvonen et al. | 701/3 |
| 2012/0053735 | A1 * | 3/2012 | Tessier et al. | 700/275 |
| 2012/0097800 | A1 * | 4/2012 | Burroughs et al. | 244/197 |
| 2012/0160967 | A1 * | 6/2012 | Scott et al. | 244/223 |

FOREIGN PATENT DOCUMENTS

| | | | |
|---|---|---|---|
| GB | 126568 | | 5/1919 |
| GB | 827089 | | 2/1960 |
| GB | 925471 | | 5/1963 |
| GB | 2465761 | A | 6/2010 |
| GB | 2482407 | A | 2/2012 |
| JP | 2008204098 | A | 2/2007 |

OTHER PUBLICATIONS

U.S. Appl. No. 12/845,246, filed Jul. 28, 2010, Stachniak et al.

U.S. Appl. No. 12/910,193, filed Oct. 22, 2010, Burroughs et al.

U.S. Appl. No. 12/976,723, filed Dec. 22, 2010, Scott et al.

* cited by examiner

POSITION CONTROL SYSTEM FOR CROSS COUPLED OPERATION OF FLY-BY-WIRE CONTROL COLUMNS

FIELD OF THE INVENTION

This invention generally relates to control columns for aircrafts and more particularly to fly-by-wire control columns for aircrafts.

BACKGROUND OF THE INVENTION

As the performance requirements of both civil and military aircraft increases, conventional control technologies using mechanical linkages cannot relieve the pilot from higher mental and manual control activity. As such, today's high performance aircraft as well as some transport aircraft use "fly-by-wire" sidesticks and center sticks also referred to as "control columns".

These fly-by-wire control columns simulate tactile feedback relating to the control surfaces of the aircraft to the control columns.

In a "passive" control column, the pilot feels spring or damper forces according to the applied deflection of a stick of the control column which is the control input to a flight control computer (FCC). These forces are realized by a spring and damper package. In such a passive control column, the pilot's controller forces (i.e. tactile feel) are usually fixed.

A drawback of this passive control concept, as opposed to conventional controllers, is that the pilot loses the contact with the control surfaces of the aircraft and loses contact with the second pilot in the cockpit. As such, the pilot loses tactile information and can only use visual cues to inform him about the actual flight state and available trim control power as well as what the other pilot is doing.

In a "direct drive active" control column, the pilot experiences a simulated control force through the use of elaborate servo systems alone. In the direct drive active control system, a motor, drive electronics, and a high bandwidth closed loop force and damping control algorithm are used to provide the tactile feedback directly to the stick simulating the tactile feedback of the control surfaces of aircraft. By using this high bandwidth system, the system is expensive and bulky due to the increased number of sensors, and the complexity of the control system. Further, it is contemplated that in these direct drive active systems, that if the motor fails, the stick can become locked thereby preventing the pilot from controlling the aircraft. To correct for this, unnecessary redundancy must be built into the system.

It is desired to provide an adjustable tactile feedback system for a control column that does not have the downfalls of standard "fully active" control columns and that can be used to provide tactile feedback to one control column relating to the activities of the pilot of the other control column.

BRIEF SUMMARY OF THE INVENTION

In one aspect, the invention provides an aircraft control system configured to provide tactile feedback between first and second control sticks relating to discrepancies in the position of the sticks relative to mechanical ground.

More particularly, in one embodiment, an aircraft control system comprising first and second sticks, first and second feedback assemblies and a control arrangement is provided. In one embodiment, the system uses an indirect drive active control system.

The first feedback assembly is movable relative to a mechanical ground. The first stick is movable relative to the mechanical ground as well as the first feedback assembly. The first stick has a first stick position which is the position of the first stick relative to the mechanical ground. The first feedback assembly has a first feedback position which is the position of the first feedback assembly relative to the mechanical ground. The first stick and first feedback assembly have a first relative error which is the first stick position minus the first feedback position.

The second feedback assembly is movable relative to the mechanical ground. The second stick is movable relative to the mechanical ground as well as the second feedback assembly. The second stick ahs a second stick position which is the position of the second stick relative to the mechanical ground. The second feedback assembly has a second feedback position which is the position of the second feedback assembly relative to the mechanical ground. The second stick and the second feedback assembly have a second relative error which is the second stick position minus the second feedback position.

The control arrangement includes a cross-coupled mode in which the control arrangement provides first and second feedback position commands to position the first and second feedback assemblies such that the first feedback position command is equal to the second relative error and the second feedback position command is equal to the first relative error.

In one embodiment, the first feedback assembly provides indirect drive tactile feedback to the first stick. This indirect drive tactile feedback provides passive feedback to the first stick when the first stick is transitioned from a first feedback neutral position of the first feedback assembly. The second feedback assembly provides indirect drive tactile feedback to the second stick. This indirect drive tactile feedback provides passive tactile feedback to the second stick when the second stick is transitioned from a second feedback neutral position of the second feedback assembly. In this situation, the system provides tactile feedback as well allows for adjusting the position of the feedback assemblies (active control) such that the passive tactile profile relative to mechanical ground can be adjusted.

In a more particular embodiment, the first feedback assembly includes a first cam surface defining the first feedback neutral position and a first resistance arrangement for biasing the cam surface. The first stick includes a first cam follower. The first resistance arrangement increasingly resists movement of the first cam follower from the first feedback neutral position to provide the passive tactile feedback. The second feedback assembly includes a second cam surface defining the second feedback neutral position and a second resistance arrangement. The second stick includes a second cam follower. The second resistance arrangement increasingly resists movement of the second cam follower from the second feedback neutral position to provide the passive tactile feedback.

In an even more particular embodiment, the first and second feedback resistance arrangements are provided by spring and damper arrangements. Additionally, in one embodiment, the first and second cam surfaces are generally V-shaped with the first cam follower positioned within the V-shape of the first cam surface and the second cam follower is positioned within the V-shape of the second cam surface. In one embodiment, the first and second feedback neutral positions are when the first and second cam followers contact both sides of the V-shaped surfaces.

In one embodiment, the first feedback assembly includes a first gimbal arrangement that provides the passive tactile feedback to the first stick and that defines the first feedback neutral position. The first feedback assembly further including a first actuator for adjusting the position of the first feedback neutral position relative to the mechanical ground such that the feedback profile of the first feedback assembly can be adjusted relative to the mechanical ground. Additionally, the second feedback assembly includes a second gimbal arrangement that provides the passive tactile feedback to the second stick and that defines the second feedback neutral position. The second feedback assembly further including a second actuator for adjusting the position of the second feedback neutral position relative to the mechanical ground such that the feedback profile of the second feedback assembly can be adjusted relative to the mechanical ground. The passive portions of the first and second feedback assemblies are interposed between the first and second actuators and the first and second sticks to provide the indirect active drive arrangement.

In one embodiment, the first gimbal arrangement and the first stick are pivotally affixed to the mechanical ground for pivotal movement about a first common axis and the second gimbal arrangement and the second stick are pivotally affixed to the mechanical ground for pivotal movement about a second common axis.

In a more particular embodiment, the first actuator is a linear actuator pivotally coupled to the first gimbal arrangement for relative pivotal movement therebetween about a third axis. The first actuator is pivotally coupled to the mechanical ground for movement about a fourth axis offset from the third axis. The second actuator is a linear actuator pivotally coupled to the second gimbal arrangement for relative pivotal movement therebetween about a fifth axis. The second actuator is pivotally coupled to the mechanical ground for movement about a sixth axis offset from the fifth axis.

In one embodiment, the first feedback assembly is configured such that failure of the first actuator does not prevent movement of the first stick relative to the mechanical ground and the first feedback assembly and the second feedback is configured such that failure of the second actuator does not prevent movement of the second stick relative to the mechanical ground and the second feedback assembly.

In one embodiment, the control arrangement also includes a priority mode in which a selected one of the first or second sticks has its feedback assembly maintained in a fixed position relative to mechanical ground and the control arrangement is configured to adjust the position of the feedback assembly of the non-selected one of the first and second sticks based on a difference between the first and second stick positions. This allows for one stick to be operated without tactile feedback regarding discrepancies between the first and second sticks.

In a more particular implementation of the priority mode when the first stick is the selected one of the sticks, the control arrangement controls the second feedback position such that the second feedback position is equal to the second feedback position plus the first stick position minus the second stick position. Alternatively, when the second stick is the selected one of the sticks, the control arrangement controls the first feedback position such that the first feedback position is equal to the first feedback position plus the second stick position minus the first stick position.

In one embodiment, the first feedback assembly and the first stick are pivotally affixed to the mechanical ground for pivotal movement about a first common axis. Additionally, the second feedback assembly and the second stick are pivotally affixed to the mechanical ground for pivotal movement about a second common axis. The first stick position and first feedback position are measured in degrees about the first common axis, wherein the second stick position and second feedback position are measured in degrees about the second common axis.

In a further embodiment, an aircraft control system is provided that allows for adjusting the feedback profile provided to a fly-by-wire sidestick. The system includes a first stick and a first feedback arrangement providing a passive first feedback profile for the first stick relative to mechanical ground. At least a portion of the first feedback arrangement is movable relative to the mechanical ground and the first stick for adjusting the first feedback profile.

In a more particular embodiment, a first actuator is coupled to the first passive feedback arrangement for adjusting the position of the first passive feedback arrangement relative to the mechanical ground for adjusting the first feedback profile. Additionally, a feedback controller arrangement is configured to control the first actuator for adjusting the position of the first passive feedback arrangement relative to the mechanical ground.

In one embodiment, the system further includes a second stick, a second feedback arrangement and a second actuator. The second feedback arrangement provides a passive second feedback profile for the second stick relative to mechanical ground. At least a portion of the second feedback arrangement is movable relative to the mechanical ground and the second stick for adjusting the second feedback profile. The second actuator adjusts the position of the second passive feedback arrangement relative to the mechanical ground for adjusting the second feedback profile. The feedback controller arrangement is configured to control the second actuator for adjusting the position of the second passive feedback arrangement relative to the mechanical ground.

In a further embodiment, the second feedback arrangement defines a feedback neutral position. The feedback controller arrangement is configured to adjust the position of the first feedback arrangement to a position equal to the position of the second stick relative to the second feedback neutral position.

In one embodiment, the feedback controller arrangement is configured to control the second actuator to adjust the position of the second feedback arrangement to provide a biasing force biasing the second stick toward a same absolute position relative to the mechanical ground as the absolute position of the first stick relative to the mechanical ground.

In one embodiment, the feedback controller arrangement is configured to control the first actuator for adjusting the position of the first passive feedback arrangement such that a current first feedback position of the first feedback assembly is equal to a prior feedback position of the first feedback assembly plus a difference between the first stick position and the second stick position.

In one embodiment, the feedback controller arrangement is configured to control the first actuator to oscillate back and forth the first feedback arrangement when the second stick position is not equal to the first stick position. This can be used to give a warning to the pilots that there is control discrepancy or the plane has entered a stall.

Further, the system may be configured such that failure of the first actuator does not prevent movement of the first stick relative to the mechanical ground.

In a further embodiment, a first stick, a second stick, a second feedback assembly and a control arrangement is provided. The first stick is movable relative to a mechanical ground. A first stick position is the position of the first stick relative to a first common neutral position of the mechanical ground. The second stick movable relative to the mechanical ground. The second feedback assembly is movable relative to the mechanical ground and the second stick. The second stick position is the position of the second stick relative to a second common neutral position of the mechanical ground. The common neutral positions representing a same neutral position albeit in different locations. A second feedback position is the position of the second feedback assembly relative to the mechanical ground.

The control arrangement is configured to control the position of the second feedback assembly such that the second stick position is maintained equal to the first stick position.

Methods of providing feedback to control sticks of an aircraft are also provided.

In one method of providing feedback to a control stick of an aircraft, the method includes the following steps: sensing a first stick position which is the position of a first stick relative to a mechanical ground; sensing a first feedback position which is the position of a first feedback assembly relative to the mechanical ground; determining a first relative error which is the first stick position minus the first feedback position; and adjusting a second feedback position, which is the position of a second feedback assembly of a second stick relative to the mechanical ground, such that the second feedback position is equal to the first relative error.

In a more particular implementation, the method further includes the steps of sensing a second stick position which is the position of the second stick relative to the mechanical ground; sensing the second feedback position; determining a second relative error which is the second stick position minus the second feedback position; and adjusting the first feedback position such that the first feedback position is equal to the first relative error.

In one method, the steps of adjusting the first and second feedback positions occurs substantially continuously such that when one of the first and second sticks is moved to a different position relative to mechanical ground than the other stick, at least one of the first and second feedback positions are adjusted to cause the first and second feedback assemblies to remain substantially at a same relative position relative to the mechanical ground.

In one method, the method further comprises the step of passively biasing the first stick when the first stick is displaced from a feedback neutral position of the first feedback assembly and passively biasing the second stick when the second stick is displaced from a feedback neutral position of the second feedback assembly.

In one method, the method further comprises the step of initiating a priority mode to prioritize the second stick, and performing the following steps when in the priority mode: sensing the first stick position; sensing the first feedback position; sensing a second stick position which is the position of a second stick relative to the mechanical ground; determining a first stick relative error which is the second stick position minus the first stick position; and adjusting the first feedback position by adding the first stick relative error to the first feedback position.

In one method, the method further comprises the step of always maintaining the second feedback position fixed when there is a difference between the first and second stick positions.

Methods may also include vibrating the first stick by reciprocally adjusting the first feedback position when the first stick position is not equal to a second stick position.

A further method includes the steps of: sensing a first stick position which is the position of a first stick relative to a mechanical ground; sensing a first feedback position which is the position of a first feedback assembly relative to the mechanical ground; sensing a second stick position which is the position of a second stick relative to the mechanical ground; determining a first relative error which is the second stick position minus the first stick position; and adjusting the first feedback position by adding the first relative error to the first feedback position.

In one embodiment, the method further comprises the step of always maintaining the position of a second feedback assembly in a fixed position when there is a difference between the first and second stick positions. This method can be used as a priority mode where only a single one of the sticks gets feedback regarding relative error between the two different sticks.

In a further method, a method of providing tactile feedback to a first stick of an aircraft control system is provided. The method includes the steps of: providing passive feedback when the first stick is moved from a first feedback neutral position of a first feedback assembly; and adjusting the position of the first feedback neutral position of the first feedback assembly relative to a ground neutral position to adjust the biasing applied to the first stick by the first feedback assembly.

In one more particular embodiment, the step of adjusting the position of the first feedback neutral position includes adjusting the position of the first feedback neutral position relative to the ground neutral position corresponding to relative adjustments in position of a second stick of the aircraft to provide tactile feedback to the first stick relating to positioning of the second stick.

In a more particular embodiment, the relative adjustments in position of the second stick are the relative position of the second stick from a second feedback neutral position of a second feedback assembly. The step of adjusting the position of the first feedback neutral position includes adjusting the position of the first feedback neutral position equal to the displacement of the second stick from the second feedback neutral position.

In one method, the method further comprises the step of adjusting a position of the second feedback neutral position of the second feedback assembly based on a difference between the position of the first stick relative to the first feedback neutral position. In a more particular implementation, the step of adjusting a position of the second feedback neutral position includes adjusting the position of the second feedback neutral position equal to the displacement of the first stick from the first feedback neutral position.

In one method, the relative adjustments in position of the second stick are the relative adjustment in positions of the second stick relative to the first stick such that the step of adjusting the position of the first feedback neutral position includes positioning the first feedback neutral position to a position equal to the position of the second stick minus the position of the first stick plus the position of the first feedback neutral position.

In a further method, the steps of adjusting the position of the first and second feedback neutral positions substantially maintains the first and second sticks in a same position relative to the mechanical ground.

It should be noted that various ones of the aspects of these methods and systems may be used together or separately.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
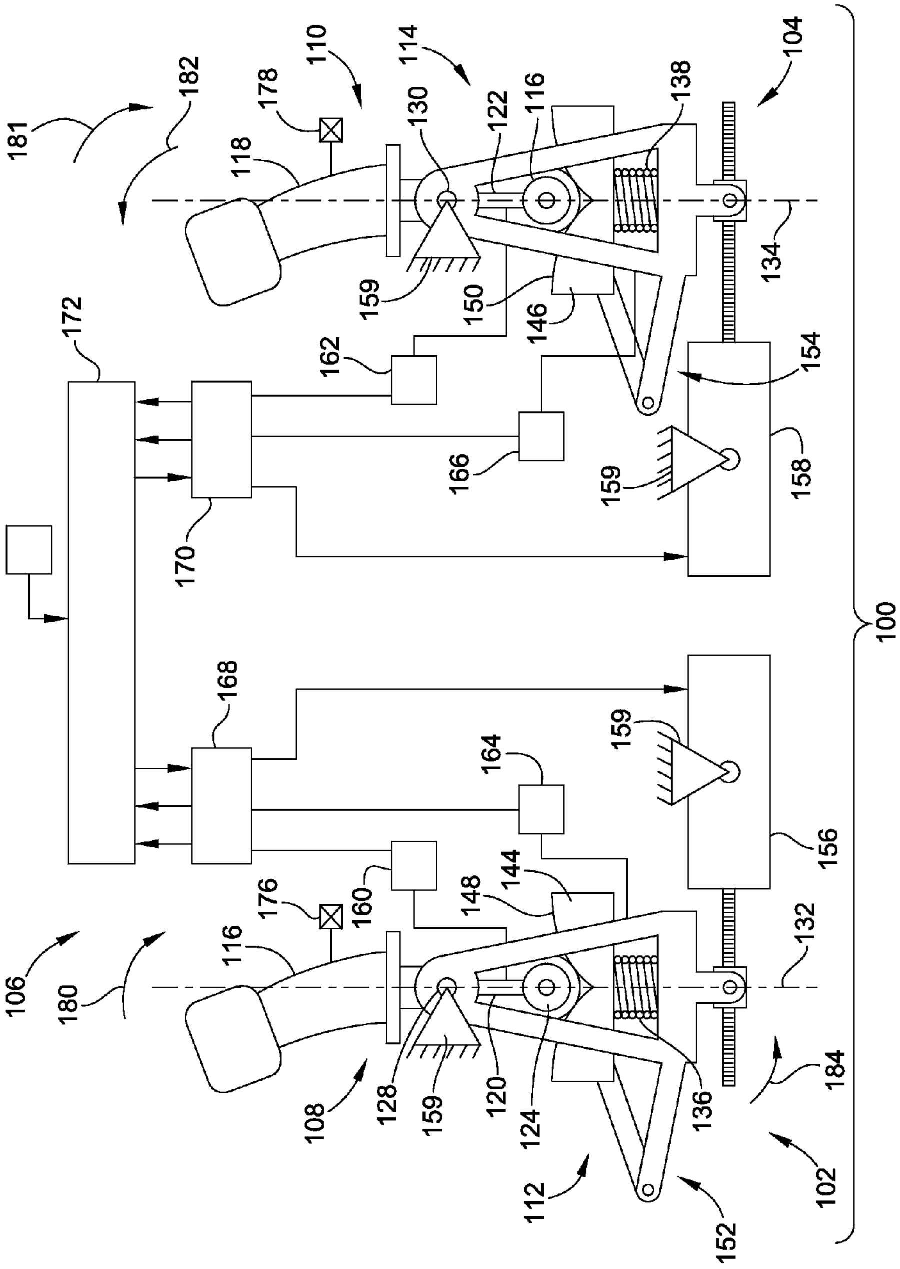
FIG. 1 is a simplified schematic representation of an aircraft control system according to an embodiment of the present invention.

FIG. 1 is a simplified schematic illustration of an aircraft control system 100 for controlling pitch, roll or both pitch and roll of an aircraft. The aircraft control system 100 generally includes first and second control columns 102, 104 (referred to generically as "control columns 102, 104"). The control columns 102, 104 are used by the pilots (e.g. pilot and co-pilot) to control various operation of the aircraft such as pitch, roll and/or pitch and roll.

The control columns 102, 104 are considered fly-by-wire control columns because the manipulation of the control columns to adjust the pitch and/or roll of the aircraft is not translated directly to the control surfaces of the aircraft by mechanical devices. Instead, the deviations of the control columns from neutral positions are converted into electrical signals. These signals are then sent to actuators which use the electrical signals to make proportional changes in the control surfaces of the aircraft.

Because the control columns 102, 104 are not mechanically linked to the control surfaces, the control system 100 incorporates tactile feedback that is applied to the control columns 102, 104 to simulate the feeling that a pilot would get if the control columns 102, 104 were in fact mechanically coupled to the control surfaces. For instance, if the pilots request a large degree of pitch or roll, the tactile feedback would increase the amount of force the pilots would have to apply to the control columns to implement that change in the control surfaces. As such, a large degree of deviation in the current control of the aircraft would be executed by applying a large force to the corresponding control column by the pilots.

The control columns 102, 104 generally include first and second sticks 108, 110 (i.e. pilot and copilot sticks) with which the pilots input control signals relating to desired pitch and/or roll. The first and second sticks 108, 110 interact with first and second feedback assemblies 112, 114 to provide tactile feedback. The columns 102, 104 are coupled to an electronic control arrangement 106 that controls the dynamic adjustments of the feedback assemblies 112, 114.

Each feedback assembly 112, 114 provides the tactile feedback to its corresponding stick 108, 110. This tactile feedback has two components. First, the tactile feedback relates to the flight state, i.e. the amount of pitch or roll the pilot is requesting due to the amount of stick deflection from a neutral position. The second portion of the tactile feedback relates to conflicts between the two different control columns 102, 104. More particularly, the feedback assemblies 112, 114 provide tactile feedback when the two sticks 108, 110 are not at the same position relative to a mechanical ground, i.e. the pilots are providing conflicting control commands to the aircraft.

Referring to FIG. 1, the control columns 102, 104 of this embodiment are substantially identical. Stick 108 generally includes a first grip portion 116 and stick 110 includes a second grip portion 118. The pilots manually manipulate the grip portions 116, 118 to control the desired amount of pitch and/or roll. Grip portion 116 is operably coupled to a first connecting rod 120 and grip portion 118 is operably coupled to second connecting rod 122. The connecting rods 120, 122 are operably coupled to or include one of first and second cam followers 124, 126, respectively (illustrated as rollers in the present embodiment). The cam followers 124, 126 interact with the corresponding feedback assembly 112, 114 to provide a variable tactile feedback profile to the sticks 108, 110.

The sticks 108, 110 pivot about a corresponding one of a first or a second common pivot point 128, 130 relative to a corresponding one of a first and a second ground neutral position 132, 134. The angular displacement of the sticks 108, 110 relative to the corresponding ground neutral position 132, 134 is proportional to the amount of pitch or roll that the pilot is requesting, i.e. proportional to the amount of change in the position of the corresponding control surfaces of the aircraft.

In general, the feedback assemblies 112, 114 provide tactile feedback to the pilot by providing resistance to the movement of the sticks 108, 110 from the ground neutral position 132, 134. In one embodiment, the feedback assemblies 112, 114 are indirect drive active feedback assemblies. As such, the system provides both active and passive feedback. The feedback assemblies 112, 114 utilize passive feedback as a first form of tactile feedback, which, as mentioned above, relates to the control state of the sticks 108, 110. This relates to the amount of pitch and/or roll requested and simulates attachment to the control surfaces of the aircraft. This passive feedback is provided by a resistance arrangements 136, 138 (i.e. a spring and damper package) that opposes the rotational movement of stick 108, 110 from a feedback neutral position by using one or more springs and/or dampers or other biasing devices.

In typical embodiments, the resistance profile of the resistance arrangement increases the greater the amount of angular displacement or deflection of the sticks 108, 110 from the neutral position 132, 134. This resistance provides feedback to the pilot such that when the pilot requests a certain amount of pitch or roll, the pilots muscle memory will tend to apply a certain amount of pushing or pulling force to overcome the force of the springs and dampers of the resistance arrangements 136, 138. Thus, the pilots will "learn" how much force is needed for control of the aircraft, i.e. how much force is used to adjust the position of the sticks 108, 110 relative to ground neutral 132, 134 for a given amount of pitch and/or roll.

The feedback assemblies 112, 114, in the illustrated embodiment, include a profiled first or second cam 144, 146 that has first and second V-shaped cam surfaces 148, 150, respectively, with which the cam followers 124, 126 interact. As the cam followers 124, 126 transition away from the center, i.e. bottom of the "V", of the cam surfaces 148, 150, the resistance arrangements 136, 138 increase the angular force applied to the corresponding stick 108, 110 to provide tactile feedback to the pilot.

The center point of cam surfaces 148, 150 can also be referred to as a "feedback neutral position" or a "gimbal neutral position", because in this position, no rotational force is being applied to the sticks 108, 110 by the feedback assemblies 112, 114. In one embodiment, in the feedback neutral position (as shown in FIG. 1), the cam followers 124, 126 will contact both sides of the corresponding V-shaped cam surface 148, 150, such that no rotational force is applied to the sticks

108, 110 by the feedback assemblies 112, 114. In FIG. 1, the feedback neutral position is illustrated as being aligned with the ground neutral positions 132, 134.

The aircraft control system 100 is also configured to provide tactile feedback to the pilots when there is a discrepancy of the control input between the two different sticks 108, 110, i.e. when one pilot is trying to provide a different degree of pitch and/or roll than the other pilot. This is the second form of tactile feedback identified above and is active feedback.

In one embodiment, the feedback assemblies 112, 114 are configured to attempt to maintain the first and second sticks 108, 110 in a same position relative to mechanical ground 159 when one pilot's actions cause a deviation in position between the two sticks 108, 110.

To provide active tactile feedback to one stick 108, 110 relating to the operation of the other stick 110, 108, the feedback assemblies 112, 114 include one of movable first and second gimbals 152, 154 that are driven by a corresponding one of first and second actuators 156, 158 to adjust the position of first and second cams 144, 146 relative to the mechanical ground 159. The adjustment of the position of the cams 144, 146 adjusts the force feedback profile relative to mechanical ground 159. Thus, different force can be applied to the corresponding sticks 108, 110 by the corresponding feedback assembly 108, 110 when the sticks 108 110 are moved relative to mechanical ground.

Further, because the passive feedback portion, i.e. the resistance arrangements 136, 138, corresponding gimbals 152, 154, cams 144, 146 are interposed between the actuators 156, 158, this provides an indirect drive as the actuators are not directly coupled to the sticks 108, 110 and/or the sticks 108, 110 may move, to at least some degree, independent of the actuators 156, 158.

Gimbals 152, 154 are rotationally mounted to the mechanical ground 159 for rotation about first and second common pivot points 128, 130, respectively. As such, the stick 108, 110 and the gimbal 152, 154 of a given control column 102, 104 are permitted to rotate about a corresponding common axis provided by the respective common pivot point 128, 130.

By adjusting the position of the gimbals 152, 154, and consequently the corresponding cams 144, 146 thereof about the common pivot points 128, 130, the resistance or feedback profile applied to the corresponding sticks 108, 110 is altered providing tactile feedback to the pilot of either increased or decreased resistance indicating a discrepancy between the commands provided by the two sticks 108, 110. This adjustability in the force profile can also used to attempt to maintain the two sticks 108, 110 in a common location when one pilot inputs such a control discrepancy by providing a corrective force to the moved stick that compensates for the increased force applied by the pilot trying to deviate from the other stick.

In the illustrated embodiment, actuators 156, 158 are illustrated as linear actuators pivotally coupled to the mechanical ground 159 and pivotally coupled to gimbals 152, 154. However, other actuators could be used such as rotary actuators positioned, for example, at pivot points 128, 130 or motors having gears that act on corresponding gearing of gimbals 152, 154. Other types of drive mechanisms could be used for adjusting the position of the gimbals 152, 154 relative to mechanical ground 159.

In general, when one of the sticks 108, 110 is deflected, the control arrangement 106 of the aircraft control system 100 commands the feedback assembly 112, 114 associated with the other stick 108, 110 to provide a proportional adjustment to the position of the corresponding gimbal 152, 154. This adjusts the position of the corresponding cam 144, 146 and its feedback neutral position to provide the tactile feedback to the other stick 108, 110 relative to the deflection of the moved stick. Additionally, absent any applied forces by the pilot of the corresponding stick, that stick will be moved to a same stick position relative to mechanical ground 159 as the deflected stick.

Each stick 108, 110 has one or more stick position sensor 160, 162 associated therewith that provides feedback to the control arrangement 106 as to the absolute position of the sticks 108, 110 relative to mechanical ground 159. These absolute positions relative to mechanical ground 159 maybe referred to as first stick position for first stick 108 and second stick position for second stick 110. These positions, in the illustrated embodiment, are angular positions about common pivot points 128, 130. These absolute positions relative to mechanical ground 159 are typically in the form of an angular relative displacement from the ground neutral positions 132, 134 about common pivot points 128, 130. However, other systems could use coordinate style systems.

Each gimbal 152, 154 has at least one gimbal position sensor 164, 166 associated therewith that provides feedback to the control arrangement 106 as to the absolute position of the gimbals 152, 154 relative to mechanical ground 159. These absolute positions relative to mechanical ground maybe generically referred to as first and second feedback positions or more specifically a first and a second gimbal position for the first and second gimbals 152, 154, respectively. Further, these positions, in the illustrated embodiment, are angular positions about common pivot points 128, 130. These absolute positions relative to mechanical ground 159 are typically in the form of an angular relative displacement from the ground neutral positions 132, 134 about common pivot points 128, 130. However, an absolute coordinate or cylindrical system could be setup and used.

The control arrangement 106 is generally a two tiered control arrangement that includes first and second low level position controllers 168, 170 (also referred to as a "gimbal controllers") for controlling and monitoring the position of the gimbals 152, 154. The low level position controllers 168, 170 control actuators 156, 158 to control the position of gimbals 152, 154, and consequently cams 144, 146, about common pivot points 128, 130.

In a preferred embodiment, control of the gimbals 152, 154 is closed loop control to accurately position gimbals 152, 154 relative to mechanical ground 159. This closed loop control could be proportional-integral-derivative (PID) style control.

The control arrangement 106 also includes a high level controller 172 (also referred to as a "cross-coupling controller" or a "dual stick controller"). The high level controller 172 compares and processes the positional information of the sticks 108, 110 and gimbals 152, 154 and generally generates a gimbal position command which commands the desired placement or adjustment in the position of the gimbals 152, 154, which is then executed by the low level position controller 168, 170.

As such, the high level controller 172 receives the stick and gimbal position information from sensors 160, 162, 164, 166. Typically, this information is passed from the low level position controllers 168, 170 to high level controller 172. However, other arrangements are contemplated such that the information is directly transmitted to high-level controller 172.

Further, while controllers 168, 170, 172 are illustrated as separate controllers, a single module could be configured to perform the functions of all of the controllers 168, 170, 172.

Further discussion of the structure and additional features of the control columns 102, 104 is provided in co-pending applications: 1) entitled "INDIRECT DRIVE ACTIVE CONTROL COLUMN," application Ser. No. 12/845,160 filed on Jul. 28, 2010, and assigned to the assignee of the instant application and 2) entitled "ACTIVE CONTROL COLUMN WITH MANUALLY ACTIVATED REVERSION TO PASSIVE CONTROL COLUMN," application Ser. No. 12/845,246 filed on Jul. 28, 2010, and assigned to the assignee of the instant application. The teachings and disclosures of both applications are incorporated herein by reference thereto.

Now that the general structures of the control system 100 have been discussed, the operation of the control system 100 will be described.

When the gimbals 152, 154 are in a neutral position relative to mechanical ground, i.e. the gimbal neutral position is equal to the ground neutral positions 132, 134 as illustrated in FIG. 1, the feedback resistance applied to the sticks 108, 110 is based on the amount of force generated by displacement of the resistance arrangements 136, 138 as the cam followers 124, 126 transition along cam surfaces 148, 150 as the sticks 108, 110 are deflected from the ground neutral positions 132, 134, and consequently from the gimbal neutral positions of the cams 144, 146. In this configuration, the pilots' muscle memory will be used to input a desired amount of pitch and/or roll by applying the "learned" amount of force to the sticks 108, 110 to overcome the resistance by resistance arrangements 136, 138. Thus, a given degree of displacement form the gimbal neutral positions can be associated with a given amount of force.

However, when the first and second sticks 108, 110 are not simultaneously and equally displaced from the corresponding ground neutral positions 132, 134, the control arrangement 106 commands corresponding changes in the position of the first and second gimbals 152, 154 so as to adjust the force applied to the sticks 108, 110. This adjusts the feedback neutral position of the corresponding feedback assembly 112, 114. This provides tactile feedback to the pilots that there is a discrepancy in the control input between the two separate sticks 108, 110. This also adjusts the amount of force the pilots need to apply to sticks 108, 110 to move the sticks 108, 110 to a desired absolute position relative to mechanical ground 159 from the ground neutral positions 132, 134. Thus, muscle memory corresponding to a desired degree of displacement will not correspond with the force required to overcome the new feedback profile provided by a corresponding feedback assembly 112, 114.

The control arrangement 106 may be configured into a cross-coupled mode where tactile feedback relating to the position of each stick 108, 110 is fed back to the other control column 102, 104. Alternatively, the control arrangement 106 may be configured into a priority mode where a prioritized stick receives no tactile feedback from the non-prioritized stick and only the non-prioritized stick shall receive tactile feedback proportional to the magnitude of the error between it and the prioritized stick.

In the illustrated embodiment, each stick 108, 110 includes a priority button 176, 178 for giving priority to the corresponding stick and taking the system out of cross-coupled mode and placing it in priority mode.

The cross-coupled mode will typically be the default mode unless one of the priority buttons 176, 178 is activated and will be described first.

In this mode, prior to any pilot input to either stick 108, 110, the sticks 108, 110 are typically in the ground neutral positions 132, 134 such that there is no deflection relative to either the mechanical ground 159 or the corresponding gimbals 152, 154 or generally the cam surfaces 148, 150. Similarly, the corresponding gimbals 152, 154 and cam surfaces 148, 150 should also have their gimbal neutral positions at the ground neutral positions 132, 134, i.e. in neutral position relative to the mechanical ground 159. As such, the measured positions of the sticks 108, 110 and gimbals 152, 154 from ground neutral positions 132, 134 should be, for example, zero.

In cross-coupled mode (also referred to as "normal mode" or "default mode"), the control arrangement 106 will operate to manipulate the gimbal position of the gimbals 152, 154 and the corresponding cam surfaces 148, 150 such that the position of first gimbal 152 is equal to the difference in the stick position of the second stick 110 relative to the gimbal position of the second gimbal 154. Similarly, the gimbal position of second gimbal 154 is equal to the difference in the stick position of the first stick 108 relative to the gimbal position of the first gimbal 152. These gimbal positions will typically be based on the position of the gimbal neutral position relative to ground neutral positions 132, 134.

Expanding on this operation and as noted above, a first stick position is the position of the first stick 108 relative to the mechanical ground 159 (i.e. ground neutral position 132). A first feedback position (also referred to as a "first gimbal position") is the position of the first feedback assembly (i.e. gimbal 152) relative to the mechanical ground 159 (i.e. ground neutral position 132). A first relative error is the first stick position minus the first feedback position. Thus, the first relative error is the position of the first stick 108 relative to the corresponding gimbal neutral position of gimbal 152. When the first relative error is zero, no net angular force should be applied to first stick 108 by the first feedback assembly 112, and particularly resistance arrangement 136.

Similarly, a second stick position is the position of the second stick 110 relative to the mechanical ground 159 (i.e. ground neutral position 134). A second feedback position (also referred to as a "second gimbal position") is the position of the second feedback assembly (i.e. gimbal 154) relative to the mechanical ground 159 (i.e. ground neutral position 134). A second relative error is the second stick position minus the second feedback position. Thus, the second relative error is the position of the second stick 110 relative to the corresponding gimbal neutral position of gimbal 154. When the second relative error is zero, no net angular force should be applied to second stick 110 by the second feedback assembly 114, and particularly resistance arrangement 138.

The control arrangement 106, in cross-coupled mode, is configured to provide first and second feedback position commands (also referred to as gimbal position commands) to position the first and second feedback assemblies 112, 114 (gimbals 152, 154) such that the first feedback position command is equal to the second relative error and the second feedback position command is equal to the first relative error. This control is a dynamic control such that incremental changes in position of the first and second sticks 108, 110 relative to their corresponding gimbals 152, 154 is quickly fed back to the other arrangement. This allows for some embodiments to substantially prevent adjustment of the two sticks to significantly different absolute stick positions.

An example of this operation will now be described.

Assume there is pilot input initially to only one stick, for example to the first stick 108 only, equal to an amount of force to displace the stick a positive 10 degrees relative to mechanical neutral 132 (clockwise about common axis 128 in FIG. 1 illustrated by arrow 180). Additionally, the second stick 110 will initially have zero input from the second pilot.

The first stick 108 will transition to a first stick position of a positive 10 degrees. The first gimbal position will be zero, as there has been no change in the position of first gimbal 152 relative to mechanical ground 159. From this change in position of the first stick 108 relative to the gimbal 152 there is a first relative error of positive 10 degrees. As noted, the control arrangement 106 operates such that the first relative error is the second gimbal command for the second gimbal 154. Thus, the control arrangement 106 sends/generates a second gimbal command of positive 10 degrees to/for second gimbal controller 170 which in-turn controls second actuator 158 using closed loop control until the second gimbal 154 has been rotated to a positive 10 degree position about common axis 130.

This also causes the second stick 110 to rotate positive 10 degrees about common axis 130 along with second gimbal 154 (positive direction illustrated by arrow 181). This results because there is no external forces applied to the second stick 110 by the other pilot, and the second cam follower 126 is trapped within the second cam 146.

Thus, after this first initial input by the pilot controlling the first stick 108, both sticks are displaced to first and second stick positions that are positive 10 degrees about respective common pivot points 128, 130.

It should be noted that the control arrangement 106 includes logic to test whether or not individual ones of the sticks 108, 110 are moving relative to its corresponding gimbal 152, 154 to determine whether or not the gimbal command of the other column 102, 104 should be adjusted.

In this case only first stick 108 was moving relative to its gimbal 152 (i.e. there was change in the first relative error) so only the second gimbal 154 was adjusted from its position, i.e. ground neutral position 134. The second stick 110 remained at its gimbal neutral position by rotating with the second gimbal 154 and thus the second relative error remained zero such that the logic determined that there was no need to change the first gimbal command. Thus, the first gimbal command remained to control the first gimbal 152 to a zero position, i.e. ground neutral position 132.

If the pilot controlling the second stick 110 decides to now adjust the control of the aircraft and deflects stick 110 from this positive 10 degree position, the control arrangement 106 will generate a new first gimbal command signal to adjust the position of the first gimbal 152. This is because the application of force to move the second stick 110 to a new position will cause it to be displaced from its gimbal neutral position generating a new non-zero second relative error.

Typically, the control of the two gimbals 152, 154 is a dynamic process such that only minor changes in position of the sticks 108, 110 will cause a corresponding change in the gimbal command for the other feedback assembly 112, 114. This will continuously adjust the feedback forces applied to the sticks 108, 110 due to incremental changes in position of either stick 108, 110, which in operation will tend to create a reaction force compensating for the new displacement of the second stick which tends to prevent movement of the second stick 110 from the positive 10 degree second stick position.

As the pilot in control of the second stick 110 attempts, for example, to move the second stick 110 back negative 1 degree (illustrated as arrow 182 in FIG. 1), this manipulation will be fed back to the first feedback arrangement 112 coupled to the first stick 108 via the control arrangement 106, and particularly high level controller 172. This provides tactile feedback to the pilot controlling the first stick 108 that there is now a discrepancy in the signals sent by the two separate control columns 102, 104.

Prior to the manipulation by the second pilot, the first pilot controlling the first stick 108 will experience the passive feedback associated with a 10 degree positive displacement. As such, the pilot controlling the first stick 108 will be apply the amount of force he has "learned" to apply to the first stick 108 to maintain the first stick 108 in the positive 10 degree stick position to overcome the resistance provided by resistance arrangement 136. This will cause an equal load on the first stick 108 such that the first stick 108 is in equilibrium.

Further, the second stick 110 will be in equilibrium because there is zero external load and zero load applied by the second gimbal 154 because the second stick 110 remains at the gimbal neutral location along the second cam surface 150. As such, there is also zero net load on the second stick 110 such that it remains in an equilibrium state.

However, once the second stick 110 is manipulated from its stick position, i.e. displaced in a counter clockwise direction, illustrated as arrow 182 from the second stick position of a positive 10 degrees, a second relative error between the second stick 110 and the second gimbal 154 is now created. The control arrangement 106 will sense the change in the second relative error and initiate a first gimbal command to adjust the position of the first gimbal 152 equal to this relative error. This almost immediately adjusts the forces applied to the first stick 108 providing tactile feedback to the first pilot of a discrepancy between the first and second sticks 108, 110.

For example, once the second stick makes it to a second stick position of positive nine degrees (i.e. it has been transitioned a negative 1 degree) the second relative error becomes a negative 1 degree. This corresponds to the difference between the second stick position of positive 9 degrees minus the second gimbal position of positive 10 degrees.

This negative 1 degree now becomes the first gimbal command that is sent by the control arrangement 106 to the first gimbal controller 168 for adjusting the position of the first gimbal 152. As such, the first gimbal controller 168 will drive the first gimbal 152 to a position of negative 1 degree, illustrated by arrow 184 in the counterclockwise direction. This counterclockwise movement of the first gimbal 152 will provide tactile feedback to the first pilot controlling the first stick 108.

If the first pilot tries to maintain the stick 108 at the first stick position of a positive 10 degrees, the force applied by the first pilot to the first stick will have to increase equal to an amount of force that is typically associated with a first stick position of a positive 11 degrees. This is because the actual relative displacement of the first stick 108 from the feedback arrangement 112, and more particularly from its first gimbal neutral position relative to first cam 144 is 11 positive degrees. This positive 11 degrees is equal to the 10 positive degrees of displacement of the first stick 108 from ground neutral minus the negative 1 degree of displacement of the first gimbal 152 from the ground neutral position 132, due to the new first gimbal command.

Typically, this tactile feedback applied to the first stick 108 will cause the first pilot to confer with the second pilot to correct the discrepancy between the two separate control inputs by the separate pilots. At that point, one of the pilots will quit applying an external load to that pilot's corresponding stick such that this un-controlled stick will be transitioned to the same orientation as the controlled stick.

However, if the first pilot maintains the first stick 108 in the first stick position of positive 10 degrees, while the first gimbal 152 transitions to a first gimbal position of negative 1 degree, this will also trigger a new change in the second gimbal command. Because there is now a new first relative error (i.e. positive 11 degrees), the second gimbal command becomes positive 11 degrees. This new second gimbal command causes the second gimbal controller 170 to drive the second gimbal 154 to a second gimbal position of positive 11 degrees. This provides additional resistance to the second stick 110.

More particularly, as the second pilot applies the force to the second stick 110 necessary for a negative 1 degree displacement, because the gimbal 154 is moving 1 degree in the positive direction to the second gimbal position of positive 11 degrees, the movement of the second stick 110 to the second stick position of positive 9 degrees requires the pilot to input force equivalent to a negative two degree displacement. This is because the second stick 110 is being displaced two negative degrees relative to the second gimbal neutral position of the second gimbal 154.

However, if the second pilot only applies the amount of force necessary for negative 1 degree of displacement, then the second stick will actually transition back to the absolute position of positive 10 degrees.

This simultaneous adjustment of both gimbals 152, 154 is the dynamic control of the system which causes both pilots to experience tactile feedback that there is a discrepancy between their input commands. In one embodiment, it will be understood, that if both pilots try to maintain the discrepancy, i.e. first stick at a first stick position of 10 degrees and the second stick at a second stick position of 9 degrees, the pilots will need to provide continuously increasing amounts of force to maintain the sticks in equilibrium because the continued adjustments of the first and second gimbals will occur. This continuously increasing amount of force will cause the pilots to determine which stick should control.

Further, because the adjustment in the first and second gimbal commands is dynamic, the updates to the first and second gimbal commands typically prevents the second stick from ever getting to the second stick position of positive 9 degrees. Instead, the position of the second gimbal is continually adjusted to counter act the force applied by the second pilot in the negative (i.e. counter clockwise direction illustrated as arrow 182) such that the second stick would substantially remain in the second stick position of positive 10 degrees.

Thus, the feedback arrangements 112, 114 continue to adjust the amount of force applied thereby to the corresponding sticks 108, 110 to provide an equilibrium state for both sticks proximate the positive 10 degree position. In other words, the adjustment of the gimbal positions acts to counter act any discrepancy in the stick positions to try and keep the two sticks in a same position relative to mechanical ground 159.

However, if the first pilot did not want to maintain the first stick 108 at the first stick position of positive 10 degrees, and decided to merely keep the force externally applied to the first stick 108 constant, the new first gimbal command of a negative 1 degree would cause the first and second sticks 108, 110 to be transitioned to same stick positions of a positive 9 degrees.

This is because the first pilot would still be applying the force necessary to displace the first stick 108 10 positive degrees from its gimbal neutral position. However, because the gimbal neutral position has moved a negative 1 degree due to the new first gimbal command, the relative error between the first stick and the first gimbal remains a positive 10 degrees. More particularly, the first stick position of positive 9 degrees minus a gimbal position of negative 1 degree is a relative error of a positive 10 degrees.

Additionally, because the first relative error is not changing because the first stick 108 is moving with the first gimbal 152, the logic will determine that there is no need to modify the second gimbal command and the second gimbal command remains at a positive 10 degrees.

Again, the sticks 108, 110 have come to equilibrium because the net forces acting on the sticks 108, 110 are zero. The external forces applied the pilots is compensated for by the gimbals 152, 154.

Figure 2:
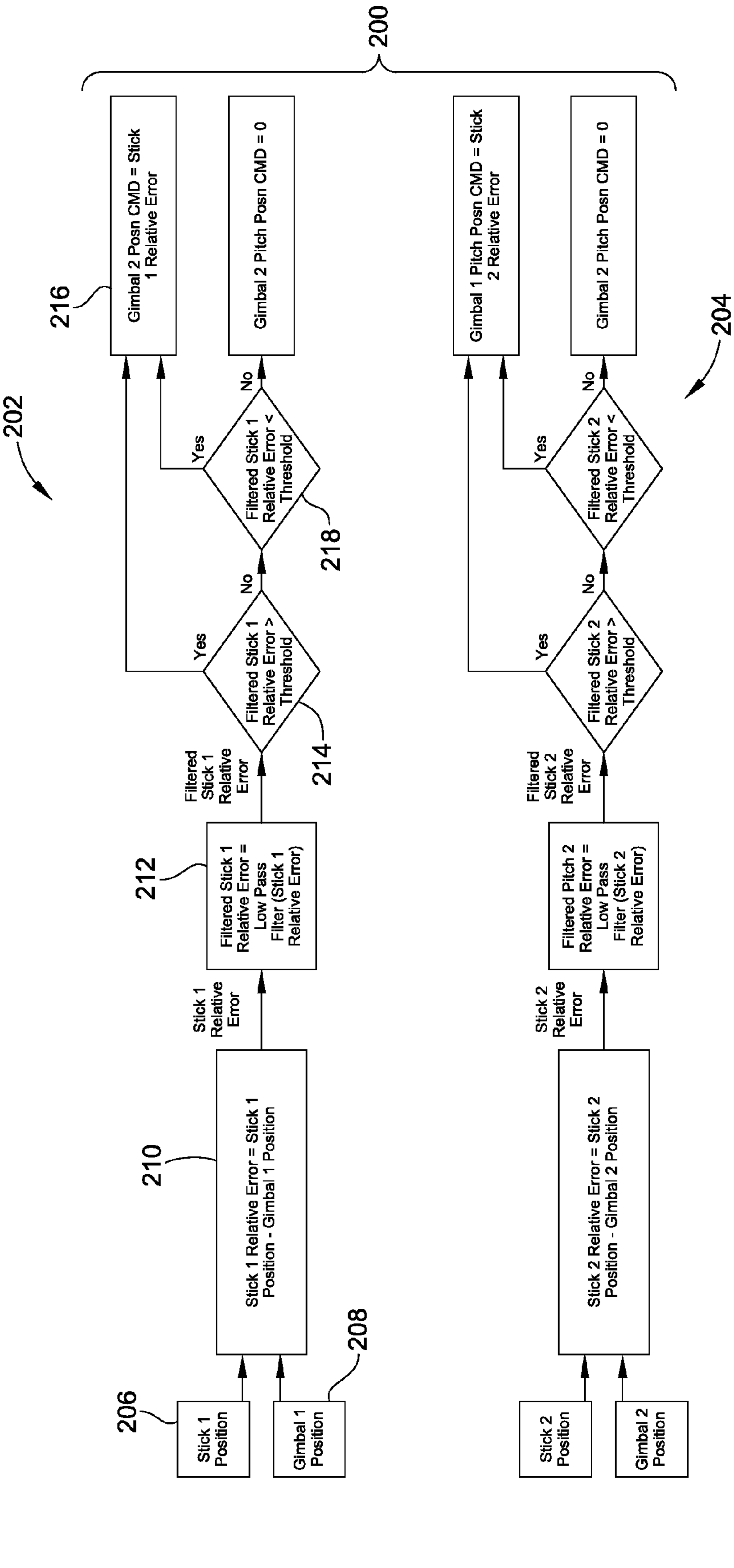
FIG. 2 is a schematic flow diagram of one mode of the control system of FIG. 1.

FIG. 2 is a schematic representation of the logic 200 for generating the first and second gimbal commands. when in the cross-coupled mode. The first branch 202 relates to determining the second gimbal command. The second branch 204 relates to determining the first gimbal command. The two branches are almost identical, except for the inputs that are used to determine the commands. As such, only the first branch 202, for determining the second gimbal command will be described herein with an understanding that the second branch operates substantially identically.

The first branch 202 uses the sensed inputs of the first stick position (block 206) and the first gimbal position (block 208). A first relative error is then determined by subtracting the first gimbal position from the first stick position (block 210). The first relative error is then low pass filtered (block 212). The filtered first relative error is then compared to determine if it is greater than a threshold value (block 214). If the filtered first relative error is greater than the threshold, the second gimbal command is equal to the first relative error (block 216). If the filtered first relative error is not greater than the threshold, it is compared to see if it less than the negative value of the threshold (block 218). If the filtered first relative error is less than the negative value of the threshold (block 218), the second gimbal command is equal to the first relative error (block 216). If the filtered first relative error is not less than the negative value of the thresh (block 218), the second gimbal command is zero (block 220), i.e. the second gimbal 154 is driven to the ground neutral position 134. These comparison steps help eliminate adjustments in the gimbal commands due to very minute changes in position of the sticks 108, 110 such as due to vibration in the system or error associated with the sensors.

As noted above, these calculations are occurring almost continuously such that the update to the position in the gimbal commands is almost instantaneous.

Now that the cross-coupled mode has been described, the priority mode will be described. Each stick 108, 110 includes a corresponding priority button 176, 178 to give that stick priority. In priority mode, the stick given priority feels no tactile feed back from the non-prioritized stick. As such the gimbal 152, 154 for the prioritized stick 108, 110 remains at ground neutral position 132, 134 at all times. In this mode, only the non-prioritized stick experiences tactile feedback, i.e. force, relating to discrepancies between the first and second stick positions. More particularly, if the non-prioritized stick does not follow the displacements of the first stick, feed back is provided to the second stick. Further, in priority mode, the non-prioritized feedback assembly is configured to attempt to maintain the non-prioritized stick at the same stick position as the prioritized stick.

An example of priority mode will now be described based on the first stick 108 being given priority.

Again, both sticks 108, 110 and gimbals 152, 154 for this example are assumed initially at the ground neutral positions 132, 134.

This mode uses a different method for determining the gimbal command for the non-prioritized stick. In this mode, the second gimbal command (i.e. the gimbal command for the non-prioritized stick) is equal to the sum of the prior second gimbal position (i.e. non-prioritized gimbal position) plus the value of the first stick position minus the second stick position (i.e. prioritized stick position minus non-prioritized stick position).

As such, if the first stick 108 is moved to a first stick position of a positive 10 degrees, the second stick 110, is again moved to a second stick position of a positive 10 degrees absent any input by the second pilot. This occurs because the second gimbal command will be the sum of the current second gimbal position of zero degrees plus the difference between first stick position (positive 10 degrees) minus the second stick position (zero degrees). Again, it is noted that this calculation is actually occurring continuously on a much more incremental scale. Thus, the second gimbal command is positive 10 degrees driving the second gimbal 154 to positive 10 degrees and simultaneously driving the second stick 110 to the same position because of the absence of any external loading on the second stick 110.

Now, if the first pilot again manipulates the first stick 108, the second gimbal 154 will be adjusted according to the new positional difference between the first and second sticks 108, 110. If the second stick 110 is held at the positive 10 degree position, tactile feedback will be generated to the second stick relating to the movement of the first stick 108. More particularly, assuming a negative movement (arrow 184) of the first stick 108 towards a first stick position of positive 9 degree.

The second gimbal controller will be instructed to similarly drive the second gimbal 154. At this point, the difference between the first stick position (positive 9 degrees) and the second stick position (positive 10 degrees) is negative 1 degree. This value is added to the current second gimbal position of positive 10 degrees to drive the second gimbal 154 to positive 9 degrees. Without external force/input from the second pilot, the second stick 110 will transition with the second gimbal 154 to a second stick position of 9 degrees. Notably, due to the dynamic action of the control arrangement 106, the movement of the second stick 110 will occur almost immediately and continuously as the first stick 108 is displaced from the position of positive 10 degrees, and not only, after the first stick 108 has transitioned to the 9 degree position.

However, if the second pilot resists this movement and tries to maintain the second stick 110 at a second stick position of positive 10 degrees, tactile feedback regarding the discrepancy will be provided to the second pilot in the amount, at least initially, of approximately 1 degree worth of force. This is because the second pilot is applying force to maintain the second stick in a position that is not coincident with the second gimbal neutral position of the second gimbal 154.

In another example, if the second pilot applied a force to the second stick 110 relating to a negative 1 degree displacement (arrow 182), the second stick 110 would substantially remain at the positive 10 degree position as the second gimbal 154 would adjust to compensate for the second pilot input.

As the second stick 110 begins to displace in the counter-clockwise direction (arrow 182), a relative error between the first stick position minus the second stick position will be generated. This will cause the second gimbal 154 to move in the positive direction to compensate for this applied force.

As this is a dynamic system that will continue to adjust the position of the second gimbal 154 by adding the relative error between the first and second stick positions, eventually the second gimbal command will be equivalent to positive 11 degrees. In this updated orientation, the second stick 110 will then be held substantially at the positive 10 degree position because the second pilot will be applying a force equal to normally displace the stick a negative 1 degree.

However, this force will be offset by the new position of the second gimbal 154 and the correspondingly new feedback force profile at the positive 11 degree position. As such, the second stick 110 will be displaced 1 degree from its gimbal neutral position thereby causing a positive 1 degree of force to be applied to the second stick 110 by the second gimbal 154 thereby compensating for the pilot generated force. Thus, the second stick 110 will have an equilibrium state substantially at the positive 10 degree position, which also corresponds to the same position as the first stick 108.

Once the second pilot decides to stop applying his force equivalent to a negative 1 degree displacement, the second gimbal 154 will adjust to continue to maintain the second stick 110 at the first stick position, i.e. the positive 10 degree position. As the second pilot begins to relieve his force from the second stick 110, the force applied to the second stick 110 by the second gimbal 154 (i.e. positive 1 degree's worth of force) will cause the second stick 110 to deflect, incrementally, in the positive direction (i.e. positive 10 degrees plus the incremental amount in direction illustrated by arrow 181). This incremental amount will create a new relative error between the first stick position and the second stick position. However, this will be a negative relative error causing an adjustment in the second gimbal command.

If the second pilot attempts to maintain a discrepancy between the position of the first and second sticks 108, 110 by continuing to attempt to transition the second stick 110 toward the negative 9 degree position, the second gimbal 154 will be continuously commanded to positively increase its position to increase the forces acting on the second stick 110. As such, the second pilot would have to continuously increase the amount of negative force applied to the second stick. However, again, most likely, the second stick will once again remain at an equilibrium position of the positive 10 degree position as the increasing force by the pilot will be continuously counter-acted by the increasing force applied by the second gimbal 154 due to the adjustment in position of the cam surface 150. This adjustment in the cam surface 150 results in an adjustment in the force profile generated thereby when referenced to mechanical ground 159.

Figure 3:
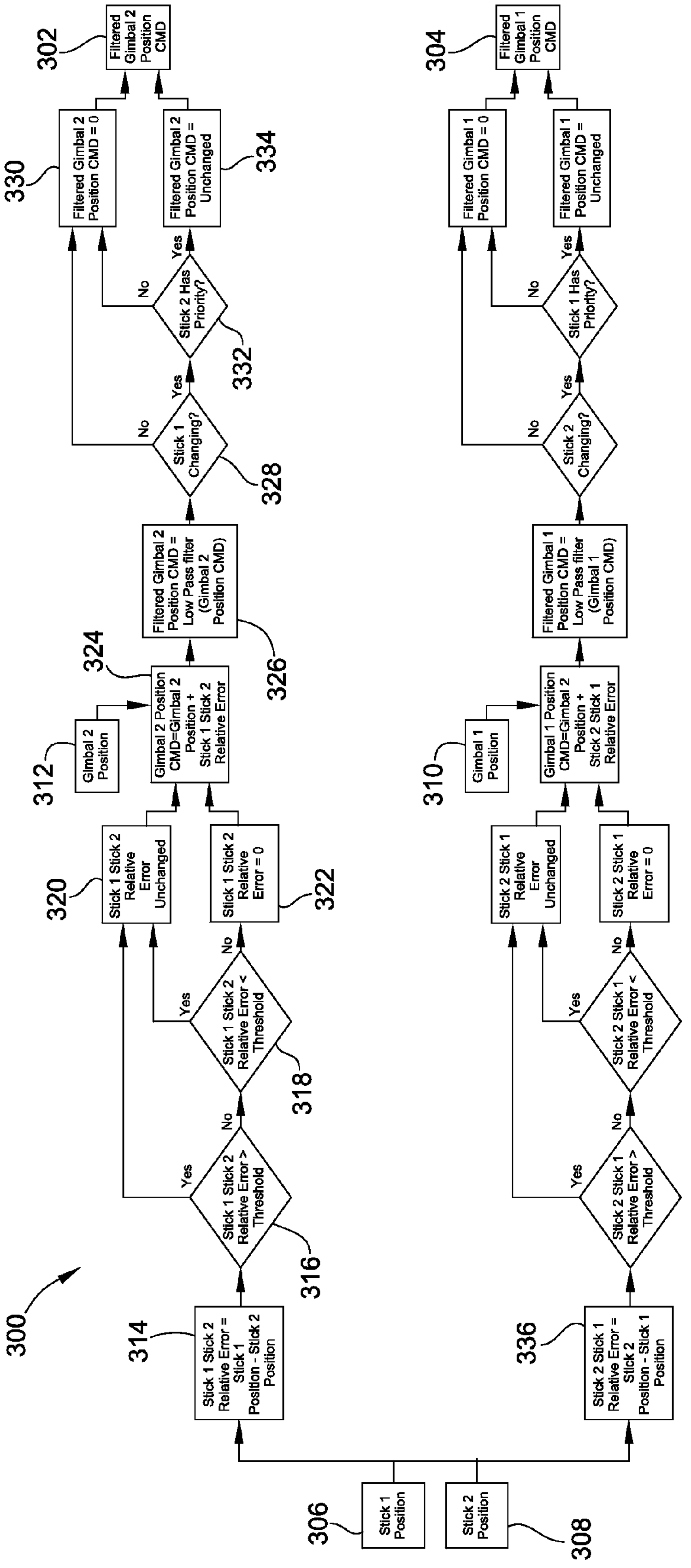
FIG. 3 is a schematic flow diagram of a different mode of the control system of FIG. 1.

FIG. 3 provides a block diagram 300 of the control logic relating to the prioritized mode. Again, the top portion of the diagram relates to the determination of the second gimbal command (block 302) and the bottom portion of the diagram relates to the determination of the first gimbal command (block 304). For this example, the top and bottom portions operate substantially the same and thus only the top portion, i.e. the portion for determining the second gimbal command will be discussed.

This mode uses inputs of the first stick position (block 306), second stick position (block 308), first gimbal position (block 310) and second gimbal position (block 308). The relative error between the first and second sticks 108, 110 (referred to as first stick-second stick relative error) is determined by subtracting the first stick position from the second stick position (block 314). Next, the first stick-second stick relative error is compared against a threshold value (blocks 316, 318). If the first stick-second stick relative error is greater than the threshold or less than the negative value of the threshold, then the first stick-second stick relative error remains unchanged (block 320). If not, the first stick-second stick relative error becomes zero (block 322). This step prevents extremely minor changes in position of the sticks from affecting changes in position of the second gimbal.

This first stick-second stick relative error is then added to the second gimbal position to determine the new second gimbal command (block 324).

The current algorithm includes low pass filtering of the second gimbal command (block 326).

The algorithm continuously checks whether or not the first stick has moved from its ground neutral position (block 328). If the first stick 108 has not moved from its ground neutral position 132, then the second gimbal command becomes zero (block 330). This is because if the first stick has not moved from ground neutral 132, the second gimbal 154 is commanded to drive the second stick 110 to its ground neutral position 134.

If the first stick 108 has moved from its ground neutral position 132, then the algorithm checks to determine if the second stick 110 has priority (block 332). If the second stick 110 has priority, the second gimbal command also becomes zero (block 330). As noted above, the stick given priority does not have tactile feedback relating to the other sticks position and thus its gimbal remains at the corresponding ground neutral position. If the second stick 110 does not have priority, then the second gimbal command remains unchanged (block 334).

It will be noted that when determining the first gimbal command (block 304) the relative error used in that portion of the algorithm is a second stick-first stick relative error which is the second stick position minus the first stick position (block 336).

Embodiments of the system may also include a dual input stick vibrate mode. The dual input stick vibrate mode uses the gimbal controller of each stick 108, 110 to superpose a substantially sinusoidal signal over the position command of the corresponding gimbal position command. In one embodiment, the sinusoidal signal has an amplitude of 5 degrees, and frequency of 30 Hz. This causes both sticks 108, 110 to experience vibration indicating that there is a discrepancy between the two sticks 108, 110. This may be immediately provide or provided after an extended period of time during which a discrepancy between the two sticks 108, 110 occurs.

Embodiments can also include a stall warning vibrate mode. In this mode, the gimbal controller 168, 170 of each stick 108, 110 superposes a sinusoidal signal over the corresponding gimbal position command.

In one embodiment, both the stall warning vibrate mode and dual input stick vibrate mode are available to act at the same time. In such an embodiment, either or both of the amplitude or frequency of the superposed sinusoidal signal may be varied so as to provide a different tactile feedback depending on the type of warning provided to the pilots.

For instance, in one embodiment, the stall warning vibrate mode may have an amplitude of 10 degrees and a frequency of 10 Hz. Thus, the pilots can easily distinguish the two separate vibrations to determine the appropriate type of warning.

A further feature of the use of the passive feedback assemblies that can be adjusted relative mechanical ground is that the draw backs of a fully passive feedback assembly or a fully active feedback assembly are not present.

More particularly, first, the use of the adjustable position gimbals 152, 154 and their correspondingly adjustable cams 144, 146, the feedback force profile for the feedback assemblies 112, 114 can be adjusted. This allows for the dynamic adjustment of the feedback profiles based on the adjustment in position of the other stick.

Additionally, because this is a semi-passive arrangement, there is less problems associated with failure. More particularly, if the actuators 156, 158 of the present embodiment fail, the sticks 108, 110 are not prevented from moving because they are not directly coupled to the actuators 156, 158. In this situation, the sticks 108, 110 are still permitted to rotate about common pivot points 128, 130 and are not locked due to failure of the actuators 156, 158.

Also, the use of these semi-passive arrangements reduces the amount of sensing and feedback such that the actuator itself provides the tactile feedback relating to the control surfaces of the aircraft. Instead, the passive feedback is provided by the cams 144, 146 and corresponding resistance arrangements 136, 138. This significantly reduces the amount of data that must be analyzed reducing the need for a high bandwidth control system.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An aircraft control system comprising:

a first feedback assembly movable relative to a mechanical ground;

a first stick movable relative to the mechanical ground and the first feedback assembly, wherein:

a) a first stick position is the position of the first stick relative to the mechanical ground;

b) a first feedback position is the position of the first feedback assembly relative to the mechanical ground; and c) a first relative error is the first stick position minus the first feedback position; and a second feedback assembly movable relative to the mechanical ground;

a second stick movable relative to the mechanical ground and the second feedback assembly, wherein:

a) a second stick position is the position of the second stick relative to the mechanical ground;

b) a second feedback position is the position of the second feedback assembly relative to the mechanical ground; and c) a second relative error is the second stick position minus the second feedback position; and a control arrangement including a cross-coupled mode in which the control arrangement provides first and second feedback position commands to position the first and second feedback assemblies wherein the first feedback position command is equal to the second relative error and the second feedback position command is equal to the first relative error.

2. The aircraft control system of claim 1, wherein the first feedback assembly provides passive tactile feedback to the first stick when the first stick is transitioned from a first feedback neutral position of the first feedback assembly; and wherein the second feedback assembly provides passive tactile feedback to the second stick when the second stick is transitioned from a second feedback neutral position of the second feedback assembly.

3. An aircraft control system comprising:

a first feedback assembly movable relative to a mechanical ground;

a first stick movable relative to the mechanical ground and the first feedback assembly, wherein:

a) a first stick position is the position of the first stick relative to the mechanical ground;

b) a first feedback position is the position of the first feedback assembly relative to the mechanical ground; and c) a first relative error is the first stick position minus the first feedback position; and a second feedback assembly movable relative to the mechanical ground;

a second stick movable relative to the mechanical ground and the second feedback assembly, wherein:

a) a second stick position is the position of the second stick relative to the mechanical ground;

b) a second feedback position is the position of the second feedback assembly relative to the mechanical ground;

c) a second relative error is the second stick position minus the second feedback position; and a control arrangement including a cross-coupled mode in which the control arrangement provides first and second feedback position commands to position the first and second feedback assemblies wherein the first feedback position command is equal to the second relative error and the second feedback position command is equal to the first relative error;

wherein the first feedback assembly provides passive tactile feedback to the first stick when the first stick is transitioned from a first feedback neutral position of the first feedback assembly;

wherein the second feedback assembly provides passive tactile feedback to the second stick when the second stick is transitioned from a second feedback neutral position of the second feedback assembly; and wherein the first feedback assembly includes a first cam surface defining the first feedback neutral position and a first resistance arrangement, the first stick includes a first cam follower, wherein the first resistance arrangement increasingly resists movement of the first cam follower from the first feedback neutral position to provide the passive tactile feedback; and wherein the second feedback assembly includes a second cam surface defining the second feedback neutral position and a second resistance arrangement, the second stick includes a second cam follower, wherein the second resistance arrangement increasingly resists movement of the second cam follower from the second feedback neutral position to provide the passive tactile feedback.

4. The aircraft control system of claim 3, wherein the first and second feedback resistance arrangements are provided by spring and damper arrangements; and the first and second cam surfaces are generally V-shaped with the first cam follower positioned within the V-shape of the first cam surface and the second cam follower is positioned within the V-shape of the second cam surface, wherein the first and second feedback neutral positions are when the first and second cam followers contact both sides of the V-shaped surfaces.

5. The aircraft control system of claim 2, wherein the first feedback assembly includes a first gimbal arrangement that provides the passive tactile feedback to the first stick and that defines the first feedback neutral position, the first feedback assembly further including a first actuator for adjusting the position of the first feedback neutral position relative to the mechanical ground; and wherein the second feedback assembly includes a second gimbal arrangement that provides the passive tactile feedback to the second stick and that defines the second feedback neutral position, the second feedback assembly further including a second actuator for adjusting the position of the second feedback neutral position relative to the mechanical ground.

6. The aircraft control system of claim 5, wherein the first gimbal arrangement and the first stick are pivotally affixed to the mechanical ground for pivotal movement about a first common axis, wherein the second gimbal arrangement and the second stick are pivotally affixed to the mechanical ground for pivotal movement about a second common axis.

7. The aircraft control system of claim 5, wherein the first feedback assembly is configured such that failure of the first actuator does not prevent movement of the first stick relative to the mechanical ground and the first feedback assembly and wherein the second feedback assembly is configured such that failure of the second actuator does not prevent movement of the second stick relative to the mechanical ground and the second feedback assembly.

8. The aircraft control system of claim 1, wherein the control arrangement also includes a priority mode in which a selected one of the first or second sticks has its feedback assembly maintained in a fixed position relative to mechanical ground and the control arrangement is configured to adjust the position of the feedback assembly of the non-selected one of the first and second sticks based on a difference between the first and second stick positions.

9. The aircraft control system of claim 8, wherein when the first stick is the selected one of the sticks, the control arrangement controls the second feedback position such that the second feedback position is equal to the second feedback position plus the first stick position minus the second stick position and when the second stick is the selected one of the sticks, the control arrangement controls the first feedback position such that the first feedback position is equal to the first feedback position plus the second stick position minus the first stick position.

10. The aircraft control system of claim 1, wherein the first feedback assembly and the first stick are pivotally affixed to the mechanical ground for pivotal movement about a first common axis, wherein the second feedback assembly and the second stick are pivotally affixed to the mechanical ground for pivotal movement about a second common axis; and wherein the first stick position and first feedback position are measured in degrees about the first common axis, wherein the second stick position and second feedback position are measured in degrees about the second common axis.

11. An aircraft control system comprising:

a first stick, and a first feedback arrangement providing a passive first feedback profile for the first stick relative to mechanical ground, at least a portion of the first feedback arrangement being movable relative to the mechanical ground and the first stick for adjusting the first feedback profile; and a first actuator coupled to the first passive feedback arrangement for adjusting the position of the first passive feedback arrangement relative to the mechanical ground for adjusting the first feedback profile;

a second feedback arrangement providing a passive second feedback profile for the second stick relative to mechanical ground, at least a portion of the second feedback arrangement being movable relative to the mechanical ground and the second stick for adjusting the second feedback profile;

a second actuator for adjusting the position of the second passive feedback arrangement relative to the mechanical ground for adjusting the second feedback profile; and a feedback controller arrangement configured to control the first actuator for adjusting the position of the first passive feedback arrangement relative to the mechanical ground, the feedback controller arrangement is configured to control the second actuator for adjusting the position of the second passive feedback arrangement relative to the mechanical ground.

12. The air craft control system of claim 11, wherein the second feedback arrangement defines a feedback neutral position and wherein the feedback controller arrangement is configured to adjust the position of the first feedback arrangement to a position equal to the position of the second stick relative to the second feedback neutral position.

13. The air craft control system of claim 11, wherein the feedback controller arrangement is configured to control the second actuator to adjust the position of the second feedback arrangement to provide a biasing force biasing the second stick toward a same absolute position relative to the mechanical ground as the absolute position of the first stick relative to the mechanical ground.

14. The air craft control system of claim 11, wherein the first stick has a first stick position relative to the mechanical ground and the first feedback arrangement has a first feedback position relative to the mechanical ground;

wherein the second stick has a second stick position relative to the mechanical ground, and wherein the feedback controller arrangement is configured to control the first actuator for adjusting the position of the first passive feedback arrangement such that a current first feedback position of the first feedback assembly is equal to a prior feedback position of the first feedback assembly plus a difference between the first stick position and the second stick position.

15. The air craft control system of claim 11, wherein the second stick has a second stick position relative to the mechanical ground, and wherein the first stick has a first stick position which is the position of the first stick relative to the mechanical ground and the feedback controller arrangement is configured to control the first actuator to oscillate back and forth the first feedback arrangement when the second stick position is not equal to the first stick position.

16. A method of providing feedback to a control stick of an aircraft comprising the steps of:

sensing a first stick position which is the position of a first stick relative to a mechanical ground;

sensing a first feedback position which is the position of a first feedback assembly relative to the mechanical ground;

determining a first relative error which is the first stick position minus the first feedback position; and adjusting, using a control arrangement, a second feedback position, which is the position of a second feedback assembly of a second stick relative to the mechanical ground, such that the second feedback position is equal to the first relative error; and further comprising the steps of:

sensing a second stick position which is the position of the second stick relative to the mechanical ground;

sensing the second feedback position;

determining a second relative error which is the second stick position minus the second feedback position; and adjusting, using the control arrangement, the first feedback position such that the first feedback position is equal to the second relative error.

17. The method of claim 16, wherein the steps of adjusting the first and second feedback positions occurs substantially continuously such that when one of the first and second sticks is moved to a different position relative to mechanical ground than the other stick, at least one of the first and second feedback positions are adjusted to cause the first and second sticks to remain substantially at a same relative position relative to the mechanical ground.

18. The method of claim 17, further comprising the step of passively biasing the first stick when the first stick is displaced from a feedback neutral position of the first feedback assembly and passively biasing the second stick when the second stick is displaced from a feedback neutral position of the second feedback assembly.

19. The method of claim 16, further comprising the step of initiating a priority mode to prioritize the second stick, and performing the following steps when in the priority mode:

sensing the first stick position;

sensing the first feedback position;

sensing a second stick position which is the position of a second stick relative to the mechanical ground;

determining a first stick relative error which is the second stick position minus the first stick position; and adjusting the first feedback position by adding the first stick relative error to the first feedback position.

20. The method of claim 19, further comprising the step of always maintaining the second feedback position fixed when there is a difference between the first and second stick positions.

21. The method of claim 16, further comprising reciprocally vibrating the first stick by reciprocally adjusting the first feedback position when the first stick position is not equal to a second stick position.

* * * * *